US010150684B2

(12) United States Patent
Tharp

(10) Patent No.: US 10,150,684 B2
(45) Date of Patent: Dec. 11, 2018

(54) SYSTEM AND METHOD FOR PREVENTING AMMONIA REBOUND IN A COLD-WEATHER BIOREACTOR

(71) Applicant: Environmental Dynamics International, Inc., Columbia, MO (US)

(72) Inventor: Charles E. Tharp, Columbia, MO (US)

(73) Assignee: ENVIRONMENTAL DYNAMICS INTERNATIONAL INC., Columbia, MO (US)

( * ) Notice: Subject to any disclaimer, the term of this patent is extended or adjusted under 35 U.S.C. 154(b) by 511 days.

(21) Appl. No.: 14/609,282

(22) Filed: Jan. 29, 2015

(65) Prior Publication Data
US 2016/0200606 A1    Jul. 14, 2016

Related U.S. Application Data

(63) Continuation-in-part of application No. 14/595,666, filed on Jan. 13, 2015.

(51) Int. Cl.
C01F 3/00 (2006.01)
C02F 3/02 (2006.01)
B01D 63/00 (2006.01)
C02F 9/00 (2006.01)
C02F 1/00 (2006.01)
(Continued)

(52) U.S. Cl.
CPC ............ *C02F 3/006* (2013.01); *C02F 3/1221* (2013.01); *C02F 3/301* (2013.01); *C02F 11/02* (2013.01); *C02F 2209/02* (2013.01); *C02F 2209/14* (2013.01); *C02F 2209/40* (2013.01); *C02F 2301/043* (2013.01); *Y02W 10/15* (2015.05); *Y02W 10/27* (2015.05)

(58) Field of Classification Search
CPC .......... C02F 9/00; C02F 2101/16; C02F 3/00; C02F 3/121; C02F 3/286; C02F 3/1284; C02F 2301/043; B01D 2311/04; B01D 53/58; B01D 53/84
See application file for complete search history.

(56) References Cited

U.S. PATENT DOCUMENTS 5,133,876 A    7/1992  Tharp
5,733,456 A *  3/1998  Okey .................... C02F 3/006
                                        210/195.1

(Continued)

Primary Examiner — Ana M Fortuna
(74) Attorney, Agent, or Firm — Husch Blackwell LLP

(57) ABSTRACT

A wastewater treatment system and method are provided for preventing or reducing ammonia rebound during periods of warming weather. The system may be operated in first and second modes of operation. During the first mode of operation, wastewater may pass directly from a reactor to a partial mix cell and then to a polishing cell. During the second mode of operation, which typically occurs during a springtime warmup period, wastewater is retained within the partial mix cell until sludge and biosolids therein are substantially digested, while wastewater exiting the reactor is temporarily directed to the polishing cell, thereby bypassing the partial mix cell. Upon digestion and stabilization of the sludge and biosolids in the partial mix cell, the system may return to the first mode of operation. Sludge and biosolids may optionally be removed from the reactor during the first and second modes of operation.

21 Claims, 12 Drawing Sheets

(51) Int. Cl.
  *B01D 21/24* (2006.01)
  *C02F 3/00* (2006.01)
  *C02F 3/12* (2006.01)
  *C02F 3/30* (2006.01)
  *C02F 11/02* (2006.01)

(56) References Cited

U.S. PATENT DOCUMENTS

| | | | |
|---|---|---|---|
| 5,736,047 A * | 4/1998 | Ngo | C02F 3/12 210/170.08 |
| 6,905,602 B1 | 6/2005 | Dobie et al. | |
| 7,563,363 B2 | 7/2009 | Kuzma | |
| 8,758,620 B2 * | 6/2014 | Tharp | C02F 3/02 210/615 |
| 2003/0015469 A1 * | 1/2003 | Hedenland | C02F 3/1221 210/620 |
| 2008/0053897 A1 * | 3/2008 | Zhu | C02F 3/085 210/605 |
| 2009/0218281 A1 * | 9/2009 | Sauvignet | C02F 3/06 210/608 |
| 2010/0326906 A1 * | 12/2010 | Barnes | C02F 3/006 210/614 |
| 2014/0158614 A1 * | 6/2014 | Wang | C02F 3/02 210/605 |
| 2014/0263041 A1 * | 9/2014 | Regmi | C02F 3/006 210/605 |
| 2014/0284273 A1 | 9/2014 | Tharp et al. | |
| 2015/0232358 A1 * | 8/2015 | Conner | C02F 3/02 210/314 |
| 2015/0336827 A1 * | 11/2015 | Boltz | C02F 3/30 210/610 |
| 2016/0200606 A1 * | 7/2016 | Tharp | C02F 3/006 210/601 |
| 2016/0200608 A1 * | 7/2016 | Tharp | C02F 3/12 210/620 |

* cited by examiner

SYSTEM AND METHOD FOR PREVENTING AMMONIA REBOUND IN A COLD-WEATHER BIOREACTOR

CROSS-REFERENCE TO RELATED APPLICATIONS

This Application is a Continuation-in-Part of and claims priority to U.S. patent application Ser. No. 14/595,666, filed on Jan. 13, 2015 to Charles E. Tharp entitled "Wastewater Treatment System and Method," currently pending, the entire disclosure of which, including the entire specification and all of the drawing figures, is incorporated herein by reference.

BACKGROUND

Water and wastewater are commonly treated using a variety of techniques. In one currently known system 10 and method, as shown in FIG. 1, wastewater is initially treated in a bioreactor 12 and is then transferred to a basin 14 comprising a partial mix aerated cell 16 and a polishing cell 18. As depicted in FIG. 1, the reactor 12, partial mix cell 16 and polishing cell 18 are provided in series. The wastewater flows from the reactor 12 to the partial mix cell 16 and then from the partial mix cell 16 to the polishing cell 18.

In this prior system 10, the reactor 12 may be utilized to achieve nitrification, denitrification, removal of carbonaceous biochemical oxygen demand (BOD), and/or removal of ammonia. During the treatment of the wastewater in the reactor 12, sludge, such as waste activated sludge (WAS), and excess biosolids are generated. The sludge and excess biosolids generated in the reactor 12 flow with the wastewater into the partial mix cell 16. The sludge and biosolids settle, accumulate and form a benthal layer within the partial mix cell 16.

During warm weather, the sludge and biosolids are digested in the reactor 12 and/or partial mix cell 16, and are stabilized. When the temperature of the wastewater is at or above a certain temperature, which may be in a range between about 12° C. and 18° C. (e.g., at or above about 15° C.), the sludge and biosolids are anaerobic and aerobically digested in a generally complete reaction and therefore no ammonia is released from the sludge into the effluent flow discharged from the system 10. The digested sludge and biosolids are stable even when the temperate drops.

During cold weather, the sludge and biosolids accumulate, settle into the benthal layer and are essentially refrigerated and stored. There is typically little breakdown, digestion or biological degradation of the settled sludge and biosolids either in the partial mix cell 16 or the polishing cell 18 once the temperature of the wastewater drops below a certain temperature, which may be in a range between about 12° C. and 18° C. (e.g., below 15° C.). Once the temperature of the wastewater drops, digestion generally ceases, even though air is still being applied in the partial mix cell 16. Even though the sludge reaction is stopped, the wastewater exiting the partial mix cell 16 is still generally of high quality due to the treatment it has undergone in the reactor 12 and the solids settling in the partial mix cell 16. Any small amount of solids that are discharged with the wastewater from the partial mix cell 16 can be captured in the polishing cell 18 and the effluent flow discharged from the system 10 is generally of high quality.

Accordingly, the operating conditions within the system 10, and the treatment of the wastewater therein, are generally satisfactory during the warm weather months and cold weather months. However, as described below, the conditions and treatment during the spring season become temporarily ineffective and unacceptable.

During the spring season, the temperature of the wastewater begins to increase. Once the temperature of the sludge and biosolids within the partial mix cell 16 or polishing cell 18 increases to a certain temperature, which may be in a range between about 12° C. and 18° C. (e.g., at or above about 15° C.) or higher for an extended period of time, digestion of the stored solids resumes. As set forth above, all of the sludge and biosolids generated by the reactor 12 during the cold weather months are stored within the partial mix cell 16 or the polishing cell 18 during the cold weather months and are not digested. The length of time that the cold weather persists influences the amount of sludge and biosolids that accumulate in the partial mix cell 16 or the polishing cell 18 and remain undigested.

Once digestion resumes during the warmup in the spring season, the digestion of the sludge and biosolids increases at a logarithmic rate, thereby placing a large load on the partial mix cell 16 and polishing cell 18 for a relatively short period of time (e.g., from about two to six weeks). This spike in digestion is a predictable event that occurs each spring as the temperature of the wastewater within the system 10 rises, particularly in systems 10 located in northern regions. The rapid increase in digestion and biological activity releases ammonia from the stored biosolids into the partial mix cell 16 and polishing cell 18 thereby resulting in an effluent flow having an elevated ammonia concentration. Wastewater from the partial mix cell 16 having elevated ammonia concentrations passes through the polishing cell 18 and is discharged from the system 10 in the effluent flow. The ammonia concentrations during this period of time are very often above the levels permitted by regulatory agencies. Regulatory agencies, such as the Environmental Protection Agency (EPA), have implemented restrictions on the amount of ammonia that may be contained within effluent water discharged into streams, rivers and other bodies of water. The rebound in the amount of ammonia resulting from the rapid digestion of the sludge and biosolids that have been stored during the winter creates an ammonia level in the effluent flow that typically exceeds the limits set by the EPA and/or similar state and local agencies, particularly in systems 10 located in northern regions. This phenomenon is often referred to as "ammonia rebound" or "biological rebound." Again, the amount of sludge and biosolids produced in the reactor 12 over the winter months greatly influences the magnitude of the ammonia rebound.

Accordingly, a need exists for a wastewater treatment system and method adapted for preventing or reducing ammonia rebound or biological rebound during periods of warming weather. A need also exists for a method of modifying an existing wastewater treatment system such that it is adapted for operating in a manner to prevent or reduce such biological or ammonia rebound.

SUMMARY OF THE INVENTION

One embodiment of the present invention is directed to a system and method for treating wastewater that is adapted for reducing ammonia rebound or biological rebound during periods of warming weather. The method can be undertaken in a wastewater treatment system having a reactor, a partial mix cell, and a polishing cell arranged in series. The method is specifically adapted for controlling the amount of ammonia that is released from the system during a springtime warmup period and also controlling the amount of sludge or biosolids reaching the partial mix cell and the polishing cell of the system. The wastewater treatment system may be operated in multiple modes of operation, including a first mode of operation and a second mode of operation.

During the first mode of operation, which may occur during a majority of the year, wastewater treated in the reactor is allowed to flow from the reactor to the partial mix cell via a first conduit and then from the partial mix cell to the polishing cell. Also during the first mode of operation, all or at least a substantial portion of the wastewater treated in the reactor is prevented from flowing directly from the reactor to the polishing cell without first passing through the partial mix cell.

The method of operating the wastewater treatment system also includes the step of transitioning the system from the first mode of operation to the second mode operation when a first condition is met. In one embodiment, the first condition is met when a temperature of the wastewater increases from a temperature that is less than a predetermined temperature to a temperature that is equal to or greater than the predetermined temperature. The predetermined temperature may fall within a range between about 12° C. and 18° C. in one case, and may be approximately 15° C. in another case. In another embodiment, the first condition is met when a concentration of ammonia in the partial mix cell, polishing cell or effluent stream increases from a concentration that is less than a first predetermined ammonia concentration to a concentration that is equal to or greater than the first predetermined ammonia concentration. The first predetermined ammonia concentration may fall within a range between about 0.1 mg/L and about 3.0 mg/L in one case, and may be approximately 1.0 mg/L in another case. Notwithstanding the foregoing, it will be appreciated that the first predetermined ammonia concentration may be any other concentration level that is selected to meet regulatory effluent limits of the system. In a further embodiment, the first condition is met when a concentration of nutrients in the partial mix cell, polishing cell or effluent stream increases from a concentration that is less than a first predetermined nutrient concentration limit to a concentration that is equal to or greater than the first predetermined nutrient concentration.

The step of transitioning the system from the first mode of operation to the second mode operation may involve a number of sub-steps including: terminating all or at least a substantial portion of the flow of wastewater from the reactor to the partial mix cell, terminating all or at least a substantial portion of the flow of wastewater from the partial mix cell to the polishing cell, and establishing or otherwise increasing the flow of wastewater from the reactor to the polishing cell, thereby bypassing the partial mix cell.

During the second mode of operation, which may occur during an initial springtime warmup period, wastewater treated in the reactor is allowed to flow from the reactor to the polishing cell via a second conduit, thereby bypassing the partial mix cell. Also, during the second mode of operation, wastewater is prevented from flowing from the reactor to the partial mix cell and is also prevented from flowing from the partial mix cell to the polishing cell. Wastewater is retained in the partial mix cell during the second mode of operation so that at least a portion of the sludge and solids therein may be digested and substantially stabilized prior to release.

The method of operating the wastewater treatment system further includes the step of transitioning the system from the second mode of operation back to the first mode operation when a second condition is met. In one embodiment, the second condition is met when the sludge and biosolids being retained in the partial mix cell have at least partially digested and become substantially stabilized. In another embodiment, the second condition is met when a concentration of ammonia in the partial mix cell decreases from a concentration that is greater than a second predetermined ammonia concentration to a concentration that is equal to or less than the second predetermined ammonia concentration.

The step of transitioning the system from the second mode of operation back to the first mode operation may involve a number of sub-steps including: reestablishing or otherwise increasing the flow of wastewater from the reactor to the partial mix cell, reestablishing or otherwise increasing the flow of wastewater from the partial mix cell to the polishing cell, and terminating all or at least a substantial portion of the flow of wastewater from the reactor to the polishing cell, such that the wastewater no longer bypasses the partial mix cell.

Another aspect of the invention is directed to a system and method for removing at least a portion of the sludge and biosolids from the reactor and directing such removed sludge and biosolids to a digester, sludge disposal basin, equalization basin, or other sludge management system. The removal of sludge and biosolids from the reactor may occur during either one or both of the first and second modes of operation when certain conditions are met.

The wastewater treatment system of the present invention may further include a control system for controlling the flow of wastewater at various points in the system and also controlling the removal of sludge and biosolids from the reactor. The control system can measure or otherwise monitor wastewater temperature, nutrient concentration and/or ammonia concentration in order to control a transition from the first mode of operation to the second mode of operation and to control a transition from the second mode of operation back to the first mode of operation. The control system can measure or otherwise monitor one or more of the same parameters in order to control the removal of sludge and biosolids from the reactor.

Another aspect of the invention is directed to a wastewater treatment system that includes first and second parallel treatment zones located downstream of a reactor. The first zone can include a first partial mix cell and a first polishing cell, and the second zone can include a second partial mix cell and a second polishing cell. The system can be adapted for transferring wastewater from the reactor to the first treatment zone during one mode of operation and transferring wastewater from the reactor to the second treatment zone during another mode of operation. The system may transition between these modes of operation on an annual basis.

Upon treatment of the wastewater in accordance with the methods provided herein, the wastewater may be discharged from the system in an effluent stream.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith, reference numerals are used to indicate like or similar parts in the various views.

DETAILED DESCRIPTION OF THE INVENTION

Figure 1:
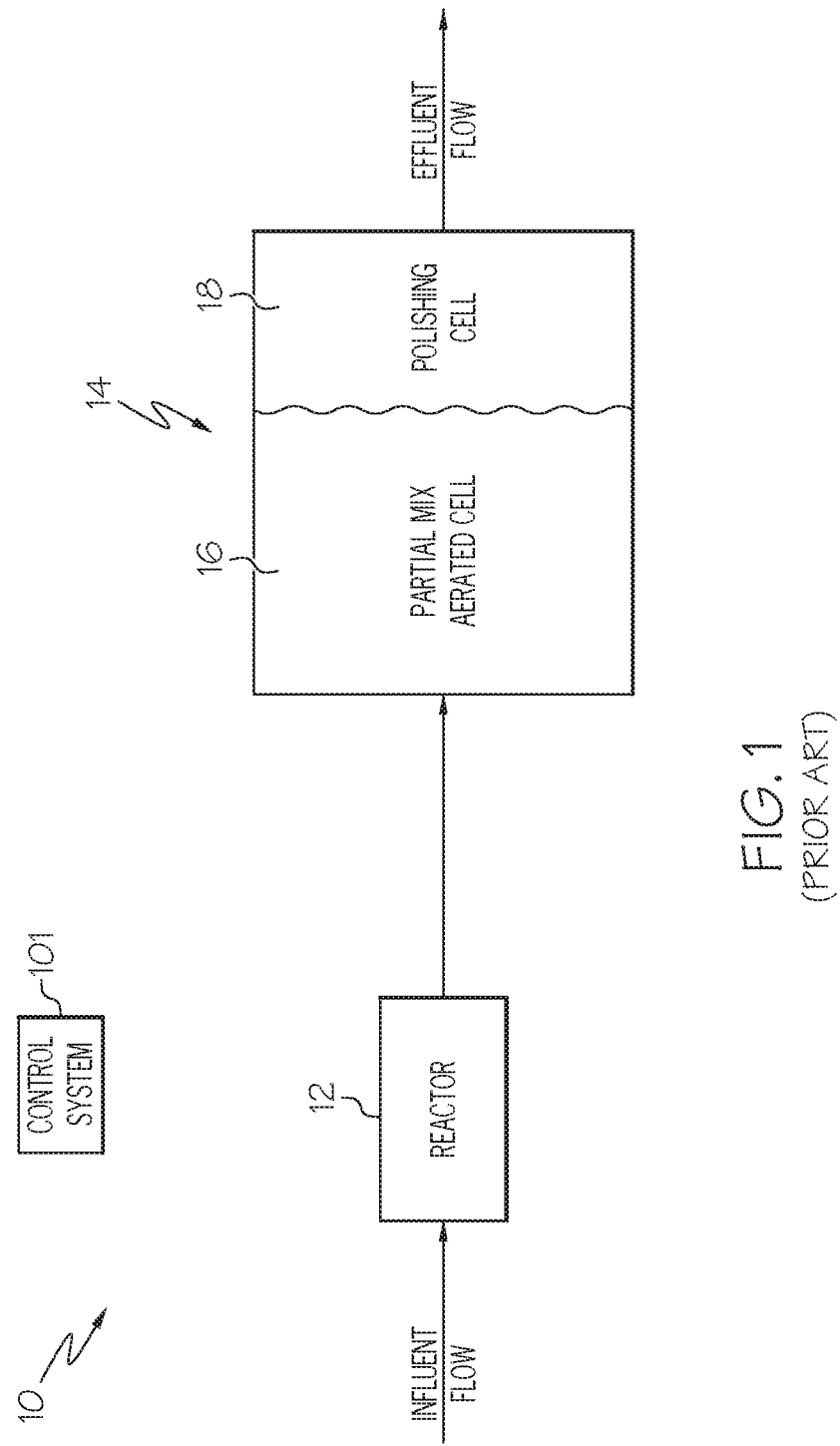
FIG. 1 is a schematic plan view of a wastewater treatment system including a reactor, a partial mix cell and a polishing cell in accordance with the prior art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a water or wastewater treatment system 100 that oxidizes ammonia, and method adapted for preventing or reducing ammonia rebound or biological rebound during periods of warming weather. The invention is also directed to a method of modifying an existing wastewater treatment system 10 such that it is adapted for operating in a manner to prevent or reduce such biological or ammonia rebound.

More specifically, the invention is directed to a method for controlling wastewater flow within the system 100 such that wastewater flowing from the reactor may optionally bypass the partial mix cell and be directed to the polishing cell, as further described herein. Another aspect of the invention is directed to a system 100 and method for controlling the amount of sludge and/or biosolids that flow from a reactor to a downstream partial mix cell and polishing cell, as further described herein. The operation of the system 100 and method may vary intermittently based on certain conditions or parameters such as, for example, wastewater temperature, nutrient concentration or ammonia concentration within the partial mix cell, polishing cell or effluent stream.

Figure 2A:
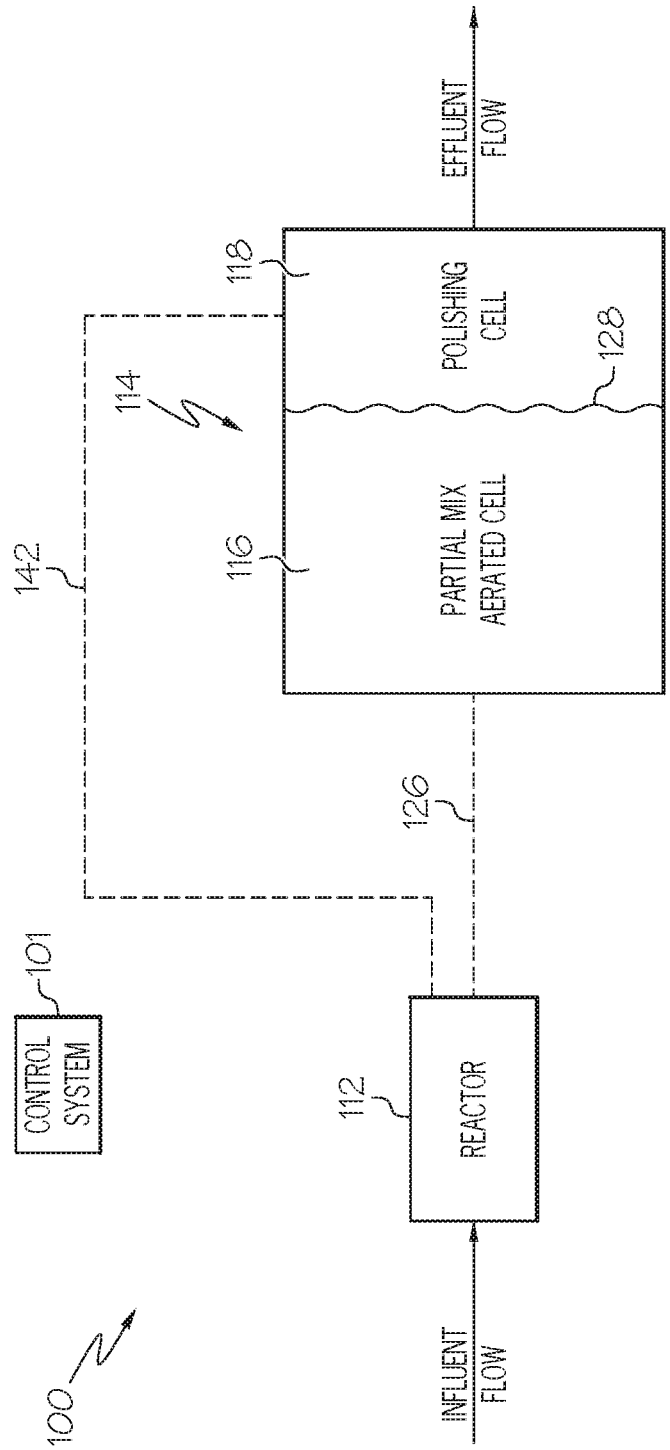
FIG. 2A is a schematic plan view of a wastewater treatment system including a bypass from a reactor to a polishing cell in accordance with a one embodiment of the present invention.
Figure 2C:
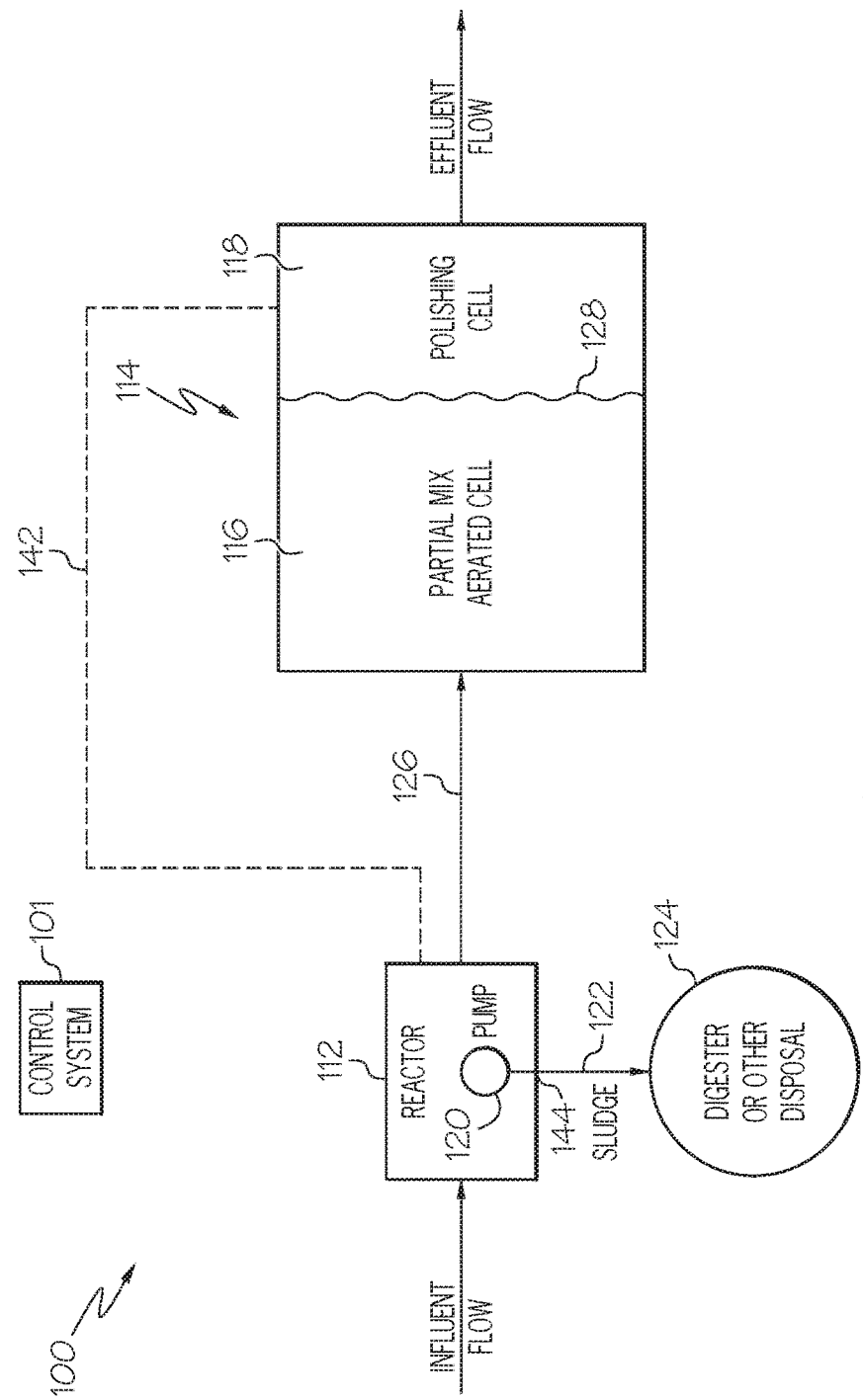
FIG. 2C is a schematic plan view of the wastewater treatment system of FIG. 2A illustrating wastewater flowing from the reactor to the partial mix cell, and also illustrating sludge being removed from the reactor to a digester.
Figure 2E:
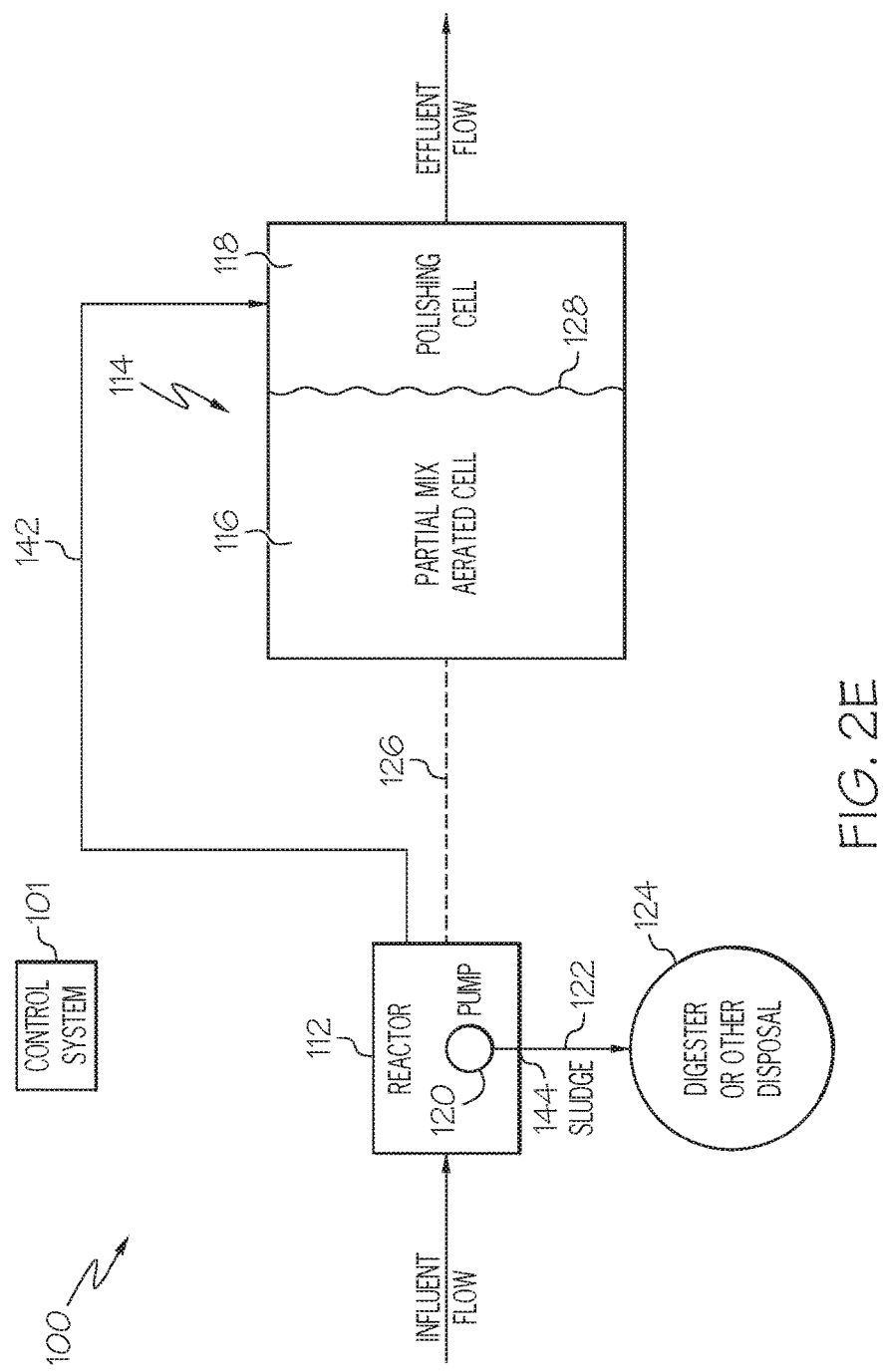
FIG. 2E is a schematic plan view of the wastewater treatment system of FIG. 2A illustrating wastewater flowing from the reactor to the polishing cell, thereby bypassing the partial mix cell, and also illustrating sludge being removed from the reactor to a digester.
Figure 2F:
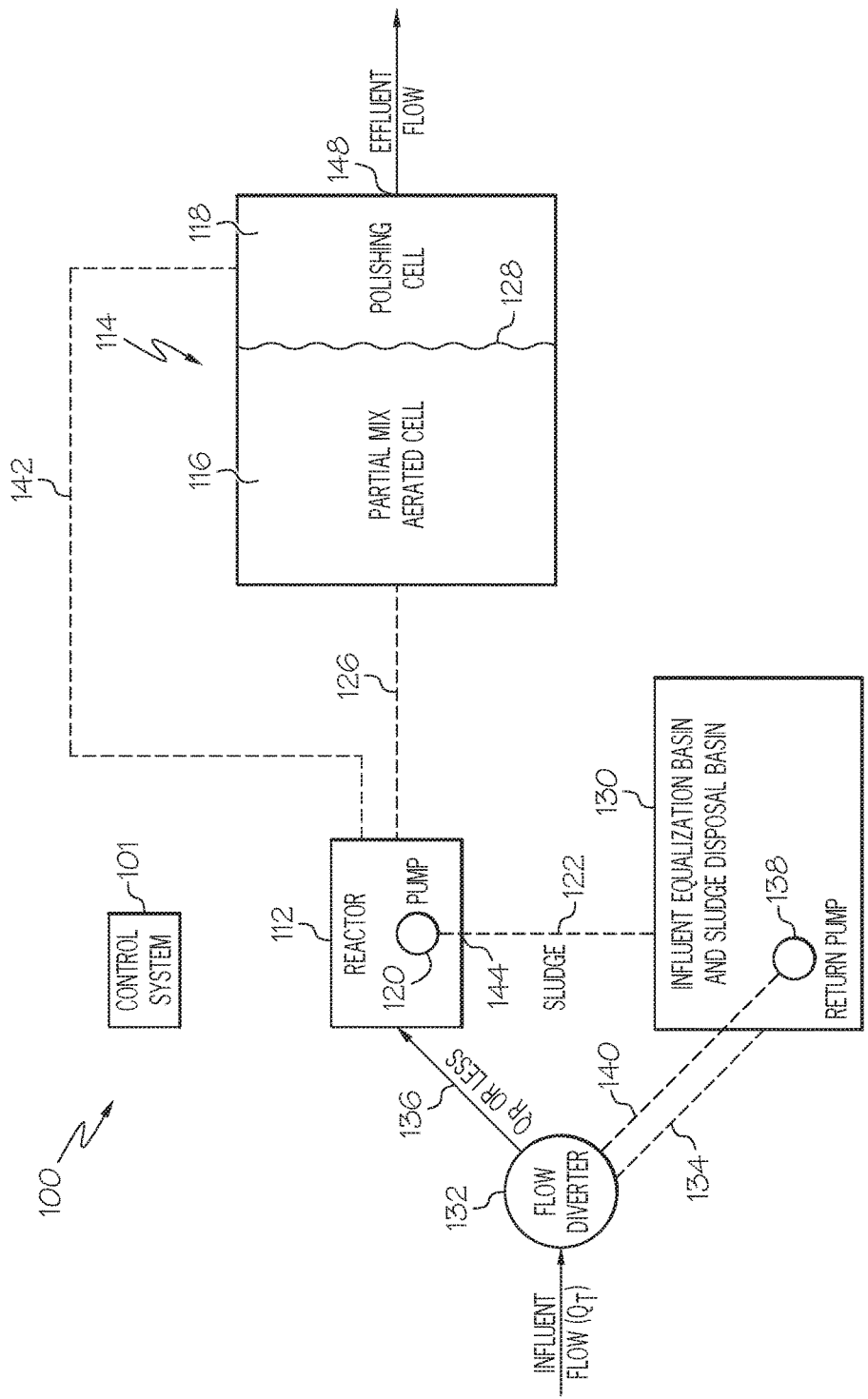
FIG. 2F is a schematic plan view of the wastewater treatment system of FIG. 2A further including an influent equalization basin.
Figure 3A:
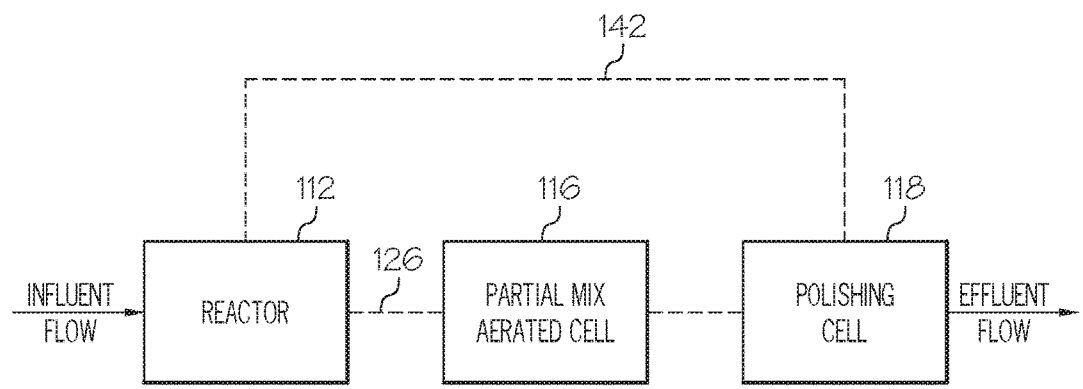
FIG. 3A is a schematic diagram of the wastewater treatment system of FIG. 2A.

Turning to FIGS. 2A and 3A, a system 100 comprising a reactor 112 and a basin 114 having a partial mix cell 116 and a polishing cell 118 is shown. As illustrated, the reactor 112, partial mix cell 116 and polishing cell 118 may be arranged in series, wherein the partial mix cell 116 is in fluid communication with the reactor 112 and the polishing cell 118 is in fluid communication with the partial mix cell 116. In the system 100, the sludge and biosolids generated in the reactor 112 during treatment of the wastewater may be managed in order to minimize the amount of sludge and biosolids flowing into the partial mix cell 116 and/or polishing cell 118. Specifically, as depicted in FIGS. 2C and 2E, the reactor 112 may be equipped with a pump 120 for removing at least a portion of sludge and biosolids from the reactor 112 via an outlet port 144 and conduit 122 and discharging the removed sludge and biosolids into a digester 124. The digester 124 may be an aerobic digester or any other suitable digester. Since a bulk of the sludge and biosolids may be removed from the reactor 112, only a small amount of sludge and biosolids may flow into the partial mix cell 116 and/or polishing cell 118 when the pump 120 is activated. As discussed in further detail below, sludge and biosolids from the reactor 112 may be discharged to the digester 124 either on a continuous basis or periodic basis when certain conditions or parameters are present. In another embodiment, as shown in FIGS. 2F and 3F, the sludge and biosolids removed from the reactor 112 may be directed to an influent equalization basin 130 instead of a digester 124. In other embodiments, the sludge and biosolids removed from the reactor 112 may be directed to any suitable sludge disposal basin, tank or other sludge management system. Alternatively, the sludge and biosolids may be removed from the reactor 112 for treatment or disposal at an offsite facility. In other embodiments, the pump 120 may be located within the conduit 126 or within the partial mix cell 116.

As used herein, the term "sludge" is defined to include activated sludge, waste active sludge, return activated sludge, surplus activated sludge, biomass, cell mass, microorganisms, inorganic settable solids and/or accumulated solids or the like. As used herein, the term "biosolids" is defined to include solid product, residue, precipitate, scum or other solids generated during the treatment of the wastewater, domestic sewage, material derived from biosolids and/or sludge or other solids that meet the EPA's pollutant and pathogen requirements for land application and surface disposal. It will further be understood that the terms "effluent flow" and "effluent stream" are used interchangeably herein.

The reactor 112 may be a high rate bioreactor and may be in the form of an earthen basin, concrete tank, metallic tank, plastic tank or any other suitable basin, tank or reservoir now known or hereafter developed. The reactor 112 may optionally have a cone-shaped, slanted, downwardly-sloped or other generally downward-directed or concave-shaped bottom wall or deflector plate for diverting sludge and biosolids to an outlet port 144 through which such sludge and biosolids may be removed from the reactor 112. The reactor 112 may be suitable for nitrification, denitrification, carbonaceous BOD removal and/or ammonia removal. For example, the reactor 112 may be a sequencing batch reactor (SBR), an intermittently decanted extended aeration lagoon (IDEAL) reactor, or a decanted bio-balanced reactor (DBBR) designed in accordance with the teachings of U.S. Pat. No. 8,758,620 to Charles Tharp, et al., entitled "Decanted Bio-Balanced Reactor and Method" (the "'620 patent") the entire disclosure of which is incorporated herein by reference, or may be any other suitable reactor now known or hereafter developed.

As demonstrated, the reactor 112 is connected to the partial mix cell 116 of the basin 114 via a decanter or outlet port and conduit 126, such that wastewater treated in the reactor 112 may be transferred or otherwise diverted to the partial mix cell 116. During a first mode of operation, the wastewater in the reactor 112 is diverted to the partial mix cell 116. During warm weather, the temperature of the sludge and biosolids is typically such that the sludge and biosolids are mixed aerobic, and may be digested in a generally complete reaction and therefore only a relatively small amount of ammonia, if any, is released in the effluent flow.

Aeration may be continuously or intermittently applied in the partial mix cell 116 allowing it to digest and stabilize the sludge and biosolids discharged from the primary reactor 112. The partial mix cell 116 can also clarify the wastewater by removing solids from effluent flow. The partial mix cell 116 may be sized so as to have a detention time suitable for aerating and stabilizing the sludge and bio solids that accumulate therein when the temperature of the wastewater within the cell 116 is at or above a predetermined temperature, such as about 15° C., for example.

A polishing cell 118 may be provided adjacent the partial mix cell 116. The polishing cell 118 can serve as a quiescent zone wherein solids that remain in the wastewater will settle to the bottom of the cell 118. Typically no aeration or very little aeration occurs within the polishing cell 118 so as to allow the minor amount of solids that may escape the partial mix cell 116 (or reactor 112, as the case may be) to settle. The polishing cell 118 is suitable for catching or trapping at least a portion of such solids and preventing them from being discharged in the effluent flow. The polishing cell 118 may include an outlet, decanter or other port through which the effluent flow is discharged therefrom. Accordingly, a clarified liquid may be maintained toward the top of the polishing cell 118, which can be decanted or otherwise discharged from the system 100 as effluent flow.

As demonstrated, the reactor 112 is connected to the polishing cell 118 of the basin 114 via a decanter or outlet port and conduit 142, such that wastewater treated in the reactor 112 can be transferred or otherwise diverted from the reactor 112 to the polishing cell 118, thereby bypassing the partial mix cell 116. During a second mode of operation, the wastewater in the reactor 112 is diverted to the polishing cell 118, as discussed in greater detail below.

It will appreciated that the basin 114 may be formed from an existing lagoon (e.g., lagoon 14) that is modified in accordance with the present invention to include two separate but connected cells, particularly, the partial mix cell 116 and polishing cell 118. The partial mix cell 116 and polishing cell 118 may be separated by a rigid or flexible wall or curtain 128. In one embodiment, the wall or curtain 128 is similar in nature to that described in the '620 patent and may comprise systems marketed by Environmental Dynamics International, Inc. under the BioReef® or BioCurtain™ names. In other embodiments, the wall 128 may be a berm that is formed within the basin. The wall 128 may baffle the flow of wastewater between the partial mix cell 116 and polishing cell 118.

Turning attention now to a method for treating wastewater using the system 100, it will be appreciated that the system 100 may be operated in multiple modes of operation when specific conditions are met in order to prevent or reduce ammonia rebound, especially during periods of warming weather. As depicted in the figures, an influent flow of wastewater is initially supplied into the reactor 112.

Figure 2B:
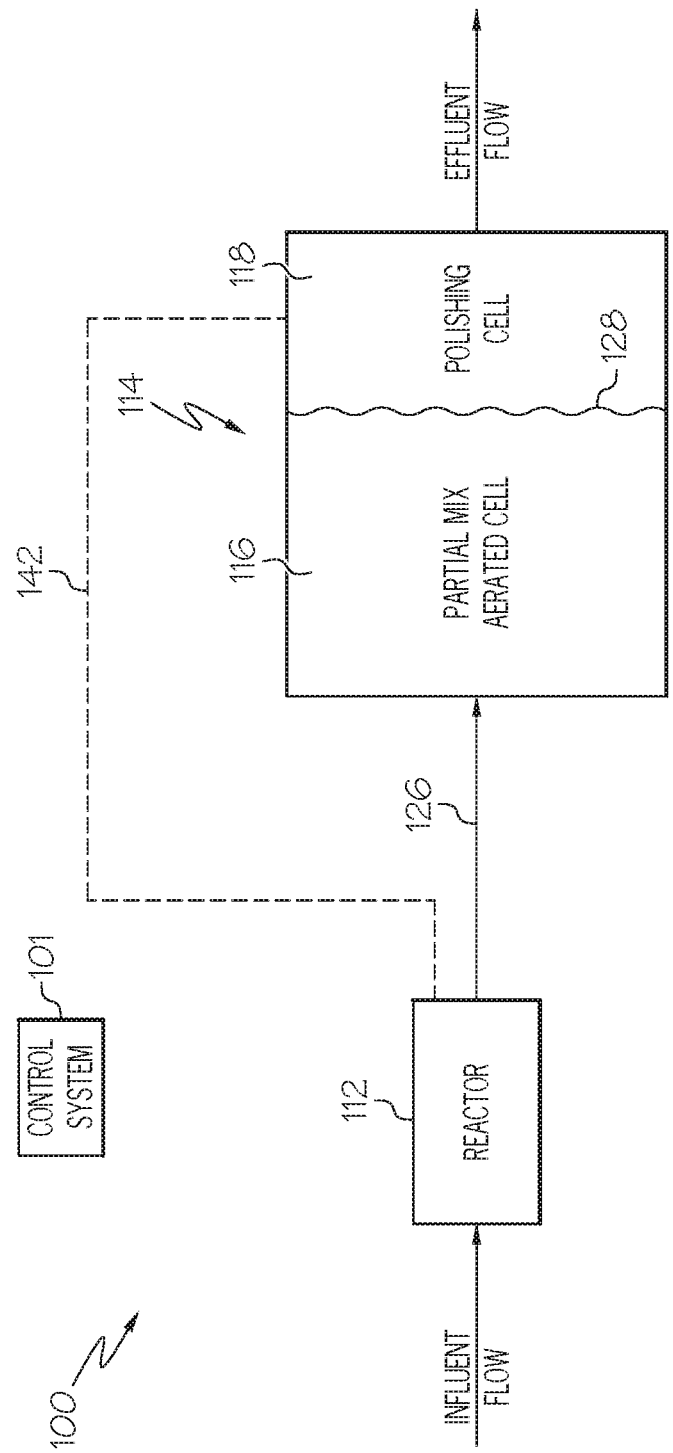
FIG. 2B is a schematic plan view of the wastewater treatment system of FIG. 2A illustrating wastewater flowing from the reactor to the partial mix cell.
Figure 3B:
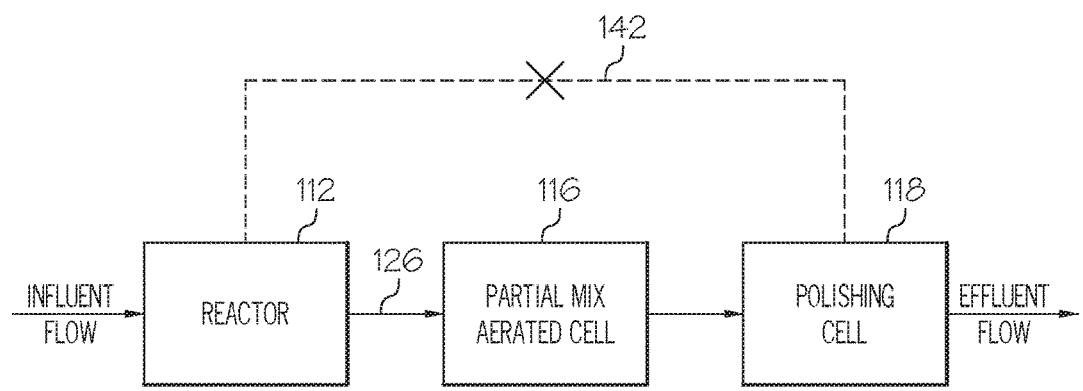
FIG. 3B is a schematic diagram illustrating the first mode of operation shown in FIG. 2B, wherein wastewater flows from the reactor to the partial mix cell, and from the partial mix cell to the polishing cell.

FIGS. 2B and 3B illustrate a first mode of operation. During the first mode of operation, wastewater treated in the reactor 112 is allowed to flow from the reactor 112 to the partial mix cell 116 via conduit 126 and then from the partial mix cell 116 to the polishing cell 118. During the first mode of operation, wastewater is prevented from flowing directly from the reactor 112 to the polishing cell 118. Accordingly, all or at least a substantial portion of a flow of wastewater from the reactor 112 to the polishing cell 118 is prevented during the first mode of operation. It will be understood that the "X" shown in FIG. 3B represents the termination or cutoff of flow of wastewater between the reactor 112 and the polishing cell 118 during the first mode of operation.

The system 100 may operate in the first mode of operation during a majority of the year. During the warm weather months, the temperature of the sludge and biosolids is typically such that the sludge and biosolids are digested in a generally complete reaction, either in the reactor 112 and/or partial mix cell 116, and therefore only a relatively small amount of ammonia, if any, is released in the effluent flow. During the cold weather months, the temperature of the sludge and biosolids is typically such that digestion of the sludge and biosolids generally ceases. The sludge and biosolids settle into a benthal layer in the partial mix cell 116 and are stored. Because digestion of the sludge and biosolids is halted, only a very small amount of ammonia, if any, is produced in the system 100 during the cold weather months. Even though the reaction is stopped, the wastewater exiting the partial mix cell 116 is still generally of high quality due to the treatment it has undergone in the reactor 112. Any small amount of solids that are discharged with the wastewater from the partial mix cell 116 can be captured in the polishing cell 118 and the effluent flow discharged from the system 100 is generally of high quality.

Figure 3C:
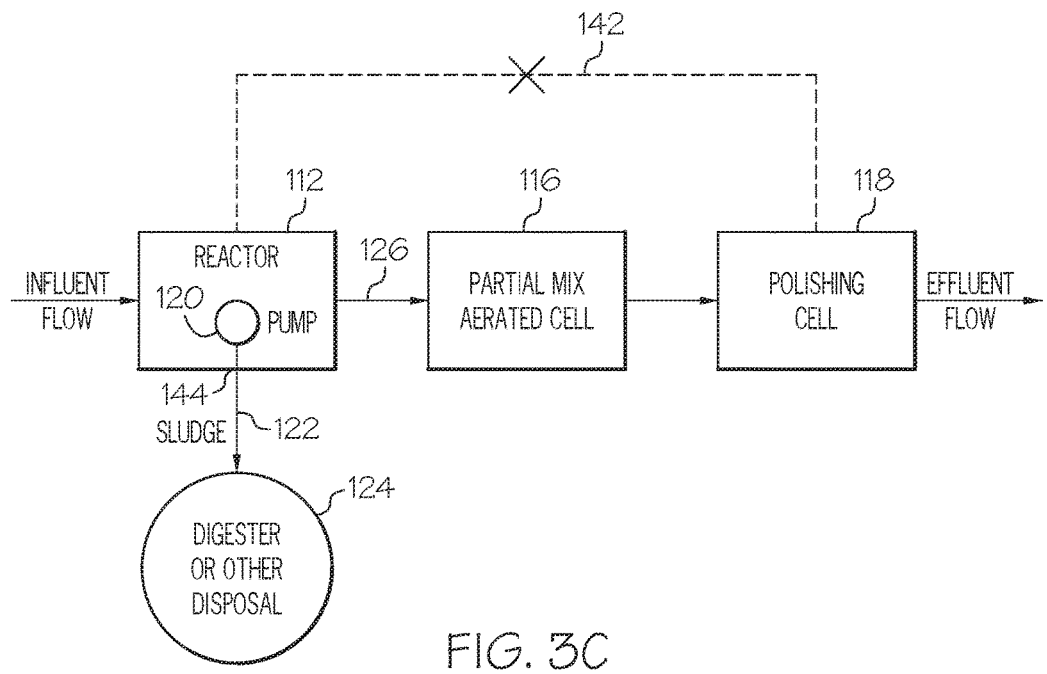
FIG. 3C is a schematic diagram illustrating the first mode of operation shown in FIG. 2C, wherein wastewater flows from the reactor to the partial mix cell, and from the partial mix cell to the polishing cell, and wherein sludge is removed from the reactor to a digester.

FIGS. 2C and 3C illustrate a variation of the first mode of operation wherein at least a portion of the sludge and biosolids from the reactor 112 is removed therefrom. As discussed above, the sludge and biosolids removed from the reactor 112 can be directed to a digester 124, sludge disposal basin, equalization basin 130, or any suitable sludge disposal basin, tank or other sludge management system. Alternatively, the sludge and biosolids may be removed from the reactor 112 for treatment or disposal at an offsite facility. As discussed in more detail below, the sludge and bio solids may be removed from the reactor 112 on a continuous basis, intermittent basis or periodic basis when certain conditions or parameters are present. The removal of the sludge and biosolids from the reactor 112 may further reduce potential rebound or duration of rebound in the partial mix cell 116 and polishing cell 118 prior to discharge.

Figure 2D:
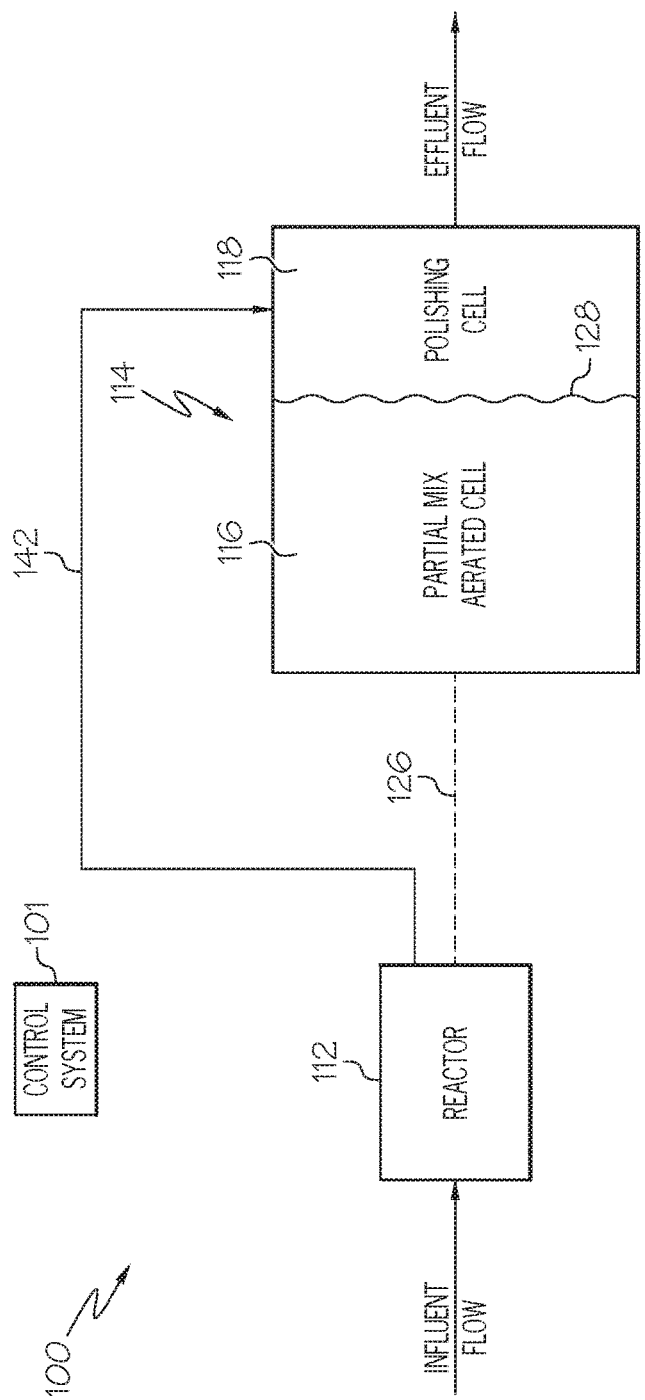
FIG. 2D is a schematic plan view of the wastewater treatment system of FIG. 2A illustrating wastewater flowing from the reactor to the polishing cell, thereby bypassing the partial mix cell.
Figure 3D:
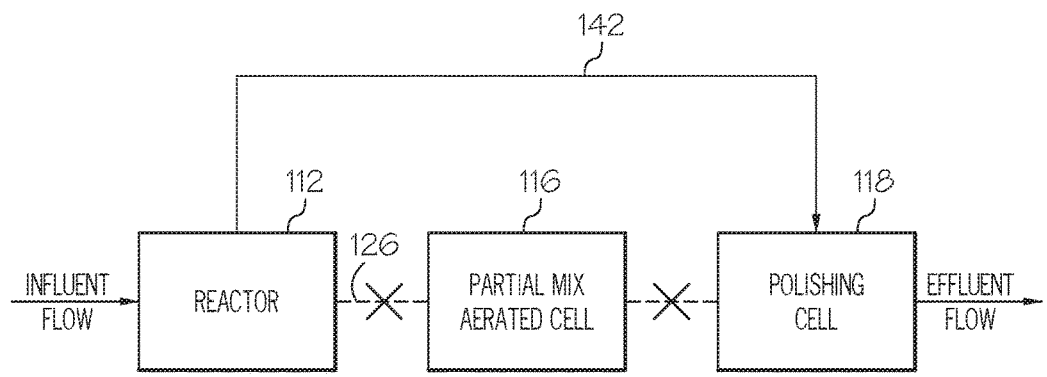
FIG. 3D is a schematic diagram illustrating the second mode of operation shown in FIG. 2D, wherein wastewater flows from the reactor to the polishing cell, thereby bypassing the partial mix cell.

FIGS. 2D and 3D illustrate a second mode of operation. During the second mode of operation, wastewater treated in the reactor 112 is allowed to flow from the reactor 112 to the polishing cell 116 via conduit 142, thereby bypassing the partial mix cell 116. During the second mode of operation, wastewater is prevented from flowing from the reactor 112 to the partial mix cell 116 and is also prevented from flowing from the partial mix cell 116 to the polishing cell 118. Accordingly, all or at least a substantial portion of the flow of wastewater from the reactor 112 to the partial mix cell 116 is prevented during the second mode of operation. Additionally, all or at least a substantial portion of the flow of wastewater from the partial mix cell 116 to the polishing cell 118 is prevented during the second mode of operation. It will be understood that the "X's" shown in FIG. 3D represent the termination or cutoff of flow of wastewater between the reactor 112 and the partial mix cell 116 and the termination or cutoff of flow of wastewater between the partial mix cell 116 and the polishing cell 118 during the second mode of operation.

The system 100 may operate in the second mode of operation during the springtime warmup period when the wastewater is increased to a temperature wherein digestion of the sludge and biosolids recommences. As discussed above, digestion of the sludge and biosolids that have accumulated in the partial mix cell 116 over the cold weather months occurs rapidly, thereby placing a large load on the partial mix cell 116 and polishing cell 118 for a relatively short period of time (e.g., from about two to six weeks). The timing and duration of this warmup period is generally dictated by the climate and weather of the site at which the system 100 is located, as well as the volume of sludge and biosolids accumulated in the partial mix cell 116 over the cold weather months. Unless otherwise addressed, the rapid increase in digestion and biological activity would result in the release of a high concentration of ammonia in the effluent flow.

In order to prevent such ammonia from being discharged from the system 100 during this warmup period, fluid communication and hydraulic flow between the partial mix cell 116 and polishing cell 118 is cutoff during the warmup period. In this regard, once the temperature of the wastewater increases to a predetermined temperature and digestion resumes, wastewater is not allowed to flow from the partial mix cell 116 through the wall 128 into the polishing cell 118 until the sludge and biosolids in the partial mix cell 116 are generally digested and stabilized. In other words, in order to prevent ammonia or biological rebound, sludge and biosolids are retained within the partial mix cell 116 for digestion during the warmup period after the wastewater has reached a predetermined temperature so that excessive amounts of ammonia are not released from the system 100. It will be appreciated that, in one embodiment, the temperature of the wastewater must be sustained at or above the predetermined temperature for a specified period of time before fluid communication and hydraulic flow between the partial mix cell 116 and polishing cell 118 is cutoff and wastewater from the reactor 112 is bypassed to the polishing cell 118.

During the period of time when fluid communication and hydraulic flow between the partial mix cell 116 and polishing cell 118 is temporally terminated, some or all of the wastewater treated by the reactor 112 is bypassed past the partial mix cell 116 and is directed to the polishing cell 118 via conduit 142. While the wastewater exiting the reactor 112 includes a small amount of solids therein, those solids may settle within the quiescent polishing cell 118 such that they are not discharged as part of the effluent flow.

Upon substantial digestion and stabilization of the sludge and biosolids in the partial mix cell 116, the system 100 may resume normal operation. In that manner, fluid communication and hydraulic flow between the partial mix cell 116 and polishing cell 118 may be reestablished and the wastewater treated in the reactor 112 may be directed to the partial mix cell 116 via conduit 126 instead of bypassing the partial mix cell 116 via conduit 142 as described above. The amount of sludge, biosolids and/or ammonia can be monitored within partial mix cell 116, as can other parameters, in order to determine when normal operation of the system 100 may be resumed.

Figure 3E:
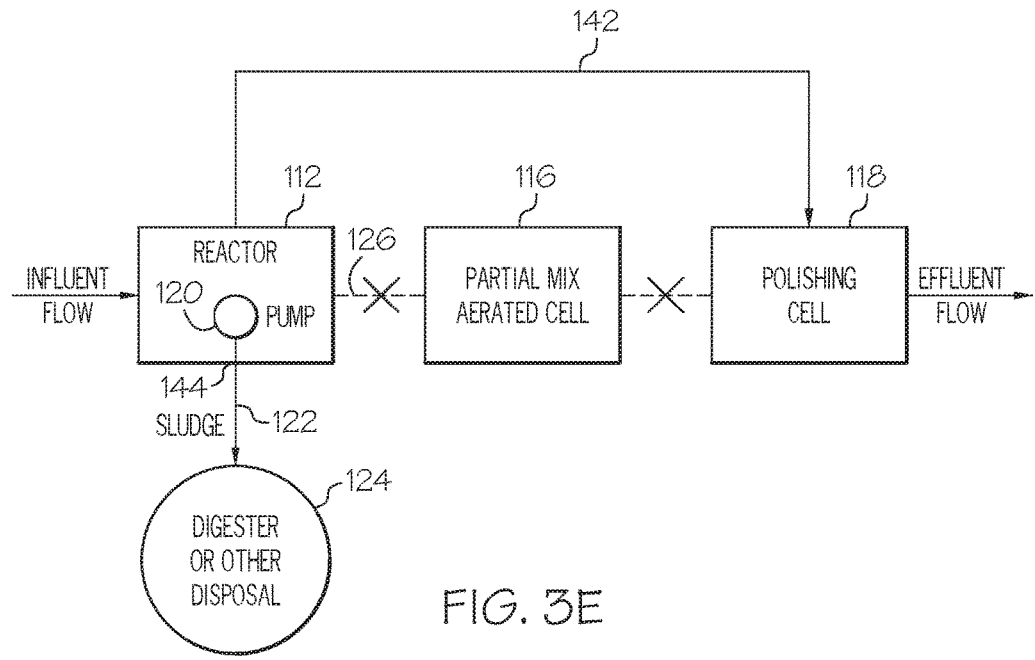
FIG. 3E is a schematic diagram illustrating the second mode of operation shown in FIG. 2E, wherein wastewater flows from the reactor to the polishing cell, thereby bypassing the partial mix cell, and wherein sludge is removed from the reactor to the digester.
Figure 3F:
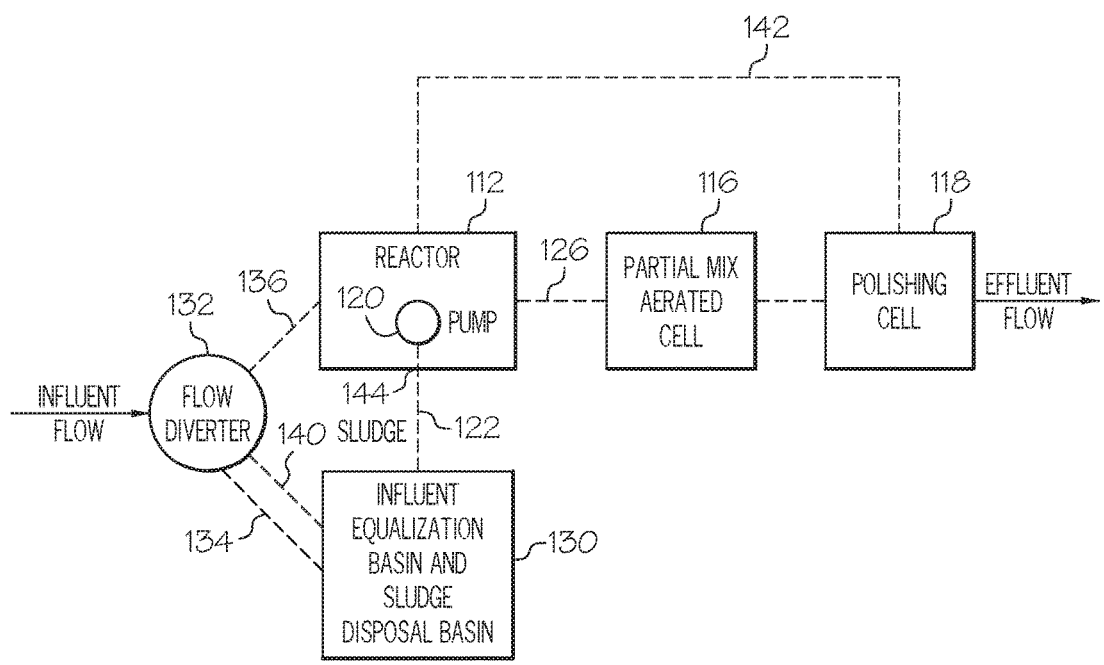
FIG. 3F is a schematic plan view of the wastewater treatment system of FIG. 2F.

FIGS. 2E and 3E illustrate a variation of the second mode of operation wherein at least a portion of the sludge and biosolids from the reactor 112 is removed therefrom. As discussed above, the sludge and biosolids removed from the reactor 112 can be directed to a digester 124, sludge disposal basin, equalization basin 130, or any suitable sludge disposal basin, tank or other sludge management system. Alternatively, the sludge and biosolids may be removed from the reactor 112 for treatment or disposal at an offsite facility. As discussed in more detail below, the sludge and biosolids may be removed from the reactor 112 on a continuous basis, intermittent basis or periodic basis when certain conditions or parameters are present. The removal of the sludge and bio solids from the reactor 112 minimizes sludge accumulation in the partial mix cell 116 and may further reduce potential rebound or duration of rebound in the partial mix cell 116 and polishing cell 118 prior to discharge.

As set forth above, the system 100 may operate in and transition between first and second modes of operation depending upon various factors. The transition steps may be automatically controlled by a control system or may be manually controlled by an operator.

The method of the present invention includes the step of transitioning the system 100 from the first mode of operation to the mode operation when one or more first conditions or parameters are met. Such conditions and parameters may include specific increases in wastewater temperature, ammonia concentration and nutrient concentration among others.

In one embodiment, the first condition governing the transition between the first mode of operation and second mode of operation is met when the temperature of the wastewater increases from a temperature that is less than a predetermined temperature to a temperature that is equal to or greater than the predetermined temperature. In that manner, the temperature of the wastewater may be measured or otherwise monitored at one or more of any number of locations, including but not limited to, upstream from the reactor 112, within the reactor 112, between the reactor 112 and the partial mix cell 116, within the partial mix cell 116, within the polishing cell 118 or downstream from the polishing cell 118. In a preferred embodiment, the temperature of the wastewater is measured or monitored either within the reactor 112 or within the partial mix cell 116. It will be appreciated that while a predetermined temperature of about 15° C. is provided as an example herein, such a predetermined temperature is not meant to be limiting and other predetermined temperatures (e.g., 10° C., 12° C., 18° C., 20° C., etc.) are also within the scope of the present invention. Accordingly, the predetermined temperature may be between about 10° C. and about 20° C. in one embodiment, is between about 12° C. and about 18° C. in another embodiment, and is about 15° C. in a further embodiment. It will be also appreciated that the temperature of the wastewater may be measured continuously, intermittently or may be determined by calculating the average temperature of the wastewater over a specified period of time. The temperature of the wastewater may be based on a single measurement, or an hourly average, daily average, weekly average or average taken over any other suitable period of time. Alternatively, the temperature of the wastewater may be estimated by measuring the temperature of the ambient air or a component of the system 100 or the like.

In another embodiment, the first condition governing the transition between the first mode of operation and second mode of operation is met when a concentration of ammonia in the wastewater increases from a concentration that is less than a first predetermined ammonia concentration to a concentration that is equal to or greater than the first predetermined ammonia concentration. In that manner, the ammonia concentration may be measured or otherwise monitored at one or more of any number of locations, including but not limited to, the partial mix cell 116, polishing cell 118 or effluent stream. The first predetermined ammonia concentration may be between about 0.1 mg/L and about 5.0 mg/L in one embodiment, between about 2.0 mg/L and about 3.0 mg/L in another embodiment, and is approximately 1.0 mg/L in a further embodiment. Notwithstanding the foregoing, it will be appreciated that the first predetermined ammonia concentration may be any other concentration level that is selected to meet a regulatory agency's effluent limits of the system. Accordingly, the first predetermined ammonia concentration may be based one or more of the following factors: the state or geographical area in which the system 100 is located; the stream, lake or other body of water into which the effluent from the system 100 is discharged; the season or time of year (e.g., higher concentration during the winter months); or other factors known to those skilled in the art. It will be also appreciated that the ammonia concentration of the wastewater may be measured or monitored continuously, intermittently or may be determined by calculating the average ammonia concentration of the wastewater over a specified period of time. The ammonia concentration of the wastewater may be based on a single measurement, or an hourly average, daily average, weekly average or average taken over any other suitable period of time.

In transitioning the system 100 from the first mode of operation to the mode operation, a number of sub-steps may occurring including: terminating all or at least a substantial portion of the flow of wastewater from the reactor 112 to the partial mix cell 116, terminating all or at least a substantial portion of the flow of wastewater from the partial mix cell 116 to the polishing cell 118, and establishing or otherwise increasing the flow of wastewater from the reactor 112 to the polishing cell 118, thereby bypassing the partial mix cell 116. The sub-steps may occur generally simultaneously or may occur in any suitable sequence.

The method of the present invention includes the step of transitioning the system 100 from the second mode of operation back to the first mode operation when one or more second conditions or parameters are met. Such conditions and parameters may include specific decreases in ammonia concentration and nutrient concentration among others.

In one embodiment, the second condition governing the transition between the second mode of operation back to first mode of operation is met when the sludge and biosolids in the partial mix cell 116 has at least partially digested and become substantially stabilized.

In another embodiment, the second condition governing the transition between the second mode of operation back to the first mode of operation is met when a concentration of ammonia in the partial mix cell 116 decreases from a concentration that is greater than a second predetermined ammonia concentration to a concentration that is equal to or less than the second predetermined ammonia concentration. The second predetermined ammonia concentration may be between about 0.1 mg/L and about 5.0 mg/L in one embodiment, between about 2.0 mg/L and about 3.0 mg/L in another embodiment and is approximately 1.0 mg/L in a further embodiment. Notwithstanding the foregoing, it will be appreciated that the second predetermined ammonia concentration may be any other concentration level that is selected to meet a regulatory agency's effluent limits of the system. Accordingly, the second predetermined ammonia concentration may be based one or more of the following factors: the state or geographical area in which the system 100 is located; the stream, lake or other body of water into which the effluent from the system 100 is discharged; the season or time of year (e.g., higher concentration during the winter months); or other factors known to those skilled in the art. It will also be appreciated that the ammonia concentration of the wastewater in the partial mix cell 116 may be measured or monitored continuously, intermittently or may be determined by calculating the average ammonia concentration of the wastewater in the partial mix cell 116 over a specified period of time. The ammonia concentration of the wastewater in the partial mix cell 116 may be based on a single measurement, or an hourly average, daily average, weekly average or average taken over any other suitable period of time.

In transitioning the system 100 from the second mode of operation back to the first mode operation, a number of sub-steps may occurring including: reestablishing or otherwise increasing the flow of wastewater from the reactor 112 to the partial mix cell 116, reestablishing or otherwise increasing the flow of wastewater from the partial mix cell 116 to the polishing cell 118, and terminating all or at least a substantial portion of the flow of wastewater from the reactor 112 to the polishing cell 118, such that the wastewater no longer bypasses the partial mix cell 116. The sub-steps may occur generally simultaneously or may occur in any suitable sequence.

As set forth above, during either one or both of the first and second modes of operation, sludge and biosolids can be removed from the reactor 112 in order to further minimize potential ammonia or biological rebound and/or minimize the duration of any such rebound. The removed sludge and biosolids can be directed to a digester 124, sludge disposal basin, equalization basin 130, or any suitable sludge disposal basin, tank or other sludge management system or, alternatively, may be removed from the system 100 entirely for treatment or disposal at an offsite facility.

Upon certain conditions or parameters being met, the sludge and biosolids may be removed from the reactor 112 on a continuous basis, intermittent basis or periodic basis. Accordingly, the pump 120 may be activated when, for example, the excess mixed liquor suspended solids (MLSS) in the reactor 112 reach a specified level, so that the MLSS in the reactor 112 is at an optimum level for treatment and the amount of solids loss into the partial mix cell 116 is reduced.

The pump 120 may be automatically or manually activated such that sludge and biosolids are removed from the reactor 112 continuously, intermittently or periodically. The diverted sludge and biosolids are thereby prevented from entering the partial mix cell 116. For maximum cold temperature operation, the pump 120 may be deactivated such that no or little sludge or biosolids are removed from the reactor 112 in order to build biomass in the reactor 112 to assist for sustaining performance at low temperatures and assisting in cold weather reaction. Accordingly, any sludge or bio solids generated in the reactor 112 are generally retained in the reactor 112 wherein the sludge and biosolids may be aerobically digested in the reactor 112. It will further be appreciated that, in an alternative embodiment, the pump 120 may be designed to run throughout the entire year regardless of the temperature of the wastewater.

By removing sludge and biosolids from the reactor 112, such sludge and biosolids are not allowed to flow into the partial mix cell 116 where they would otherwise accumulate and settle into a benthal layer. Removing a bulk of the sludge and biosolids from the reactor 112 leaves only a minor amount of sludge and biosolids that flow from the reactor 112 into the partial mix cell 116. By managing the volume of sludge and biosolids escaping the reactor 112 and preventing accumulation of any significant amount of sludge and biosolids in the partial mix cell 116, the biological or ammonia rebound and duration of rebound can be minimized. While the biological or ammonia rebound may not be entirely eliminated under this mode of operation, it can be reduced such that the ammonia concentrations in the effluent wastewater are kept to levels permitted by regulatory agencies.

The system 100 shown can further include a control system 101 for controlling the flow of wastewater at various points in the system 100. The control system 101 may comprise (a) one or more of a temperature probe, thermometer, thermistor, thermocouple, thermostat infrared temperature sensor or other suitable temperature measuring device, ammonia probe, ion meter, colorimeter, pH meter, timer or other programmable device and (b) one or more of a valve, gate, regulator, flow diverter, pump, switch, computer, processor or controller for controlling the flow of wastewater at various points in the system 100. The control system 101 may be automatically controlled or may be manually controlled by an operator. For example, the control system 101 may be designed for selectively preventing or allowing the flow of wastewater from the partial mix cell 116 to the polishing cell 118. The control system 101 may be designed for selectively diverting wastewater from the reactor 112 to either the partial mix cell 116 to the polishing cell 118.

The control system 101 is operable for switching the system 100 between the first and second modes of operation. For example, the control system 101 is adapted for switching the system 100 from the first mode of operation into the second mode of operation after the wastewater increases from a temperature that is less than a predetermined temperature to a temperature that is equal to or greater than the predetermined temperature. In this second mode of operation, as shown schematically in FIG. 3D, the control system 101 terminates a flow of wastewater from the reactor 112 to the partial mix cell 116 (as represented by the "X" over conduit 126), terminates a flow of wastewater from the partial mix cell 116 to the polishing cell 118 (as represented by the "X" located between the partial mix cell 116 the polishing cell 118), and establishes a flow of wastewater from the reactor 112 to the polishing cell 118, thereby bypassing the partial mix cell 116. During the second mode of operation, which typically occurs during the springtime warmup, the sludge and bio solids that have built up in the partial mix cell 116 over the course of the cold weather months are retained in the partial mix cell 116 for digestion and stabilization.

The control system 101 is also adapted for switching the system 100 from the second mode of operation back to the first mode of operation after at least a portion of the sludge and biosolids within the partial mix cell 116 have at least partially digested and become substantially stabilized. In the first mode of operation, as shown schematically in FIG. 3B, the control system 101 establishes (or reestablishes) a flow of wastewater from the reactor 112 to the partial mix cell 116, establishes (or reestablishes) a flow of wastewater from the partial mix cell 116 to the polishing cell 118, and terminates a flow of wastewater from the reactor 112 to the polishing cell 118 (as represented by the "X" over conduit 142). In other words, during the first mode of operation, the control system 101 causes the wastewater to flow from the reactor 112 to the partial mix cell 116 and then to the polishing cell 118, which again are arranged in series.

The system 100 can also include a control system 101 for controlling the removal of sludge and biosolids from the reactor 112. The control system 101 may comprise (a) one or more of a sludge concentration meter, ion meter, colorimeter, pH meter, timer or other programmable device and (b) one or more of a valve, gate, regulator, flow diverter, pump, switch, computer, processor or controller for controlling the removal of sludge and biosolids from the reactor 112. The control system 101 may be automatically controlled or may be manually controlled by an operator. The control system 101 is adapted for activating the discharge of sludge and biosolids through an outlet port 144 of the reactor 112, for example by activating the pump 120, when certain conditions or parameters are met. The control system 101 is also adapted for deactivating the discharge of sludge and biosolids through the outlet port 144 of the reactor 112, for example by deactivating the pump 120, when other conditions or parameters are met.

As mentioned above and shown in FIGS. 2F and 3F, an equalization basin 130 may be provided as part of a flow management system. Like the digester 124, the equalization basin 130 can be arranged in a side-line configuration relative to the remainder of the system 100. The equalization basin 130 may be adapted to mitigate or dampen changes in the volumetric flow ($Q_T$) of influent wastewater entering the system 100 by providing storage to hold wastewater when it is arriving at the system 100 too rapidly, and to supply wastewater to the reactor 112 when it is arriving at the system 100 at a flow rate less than the reactor's design flow rate ($Q_R$). In one embodiment, the equalization basin 130 is a primary lagoon basin from an existing lagoon system that has been repurposed to serve as an equalization basin.

As demonstrated in FIG. 2F, a flow diverter 132 may be provided which may comprise a flow splitter, splitter box and/or pump station. The flow diverter 132 directs the total flow $Q_T$ of influent wastewater to both of (a) the influent equalization basin 130 via conduit 134 and (b) the reactor 112 via conduit 136, as needed. The flow diverter 132 may be designed to continuously pass flow of influent wastewater to the reactor 112 at volumes equal to or less than the reactor's design flow rate $Q_R$. If the total flow $Q_T$ of influent wastewater flowing into the diverter 132 is equal to or less than the reactor's predetermined maximum flow rate $Q_R$, then the entire total flow $Q_T$ of incoming wastewater may be directed to the reactor 112. However, in cases, for example during a storm event, where the total flow $Q_T$ of influent wastewater flowing into the diverter 132 is greater than the design flow rate $Q_R$ of the reactor 112, then only a first portion of the total flow $Q_T$ is directed to the reactor 112 at a rate equal to or less than reactor's predetermined maximum flow rate $Q_R$. In such cases, a second portion of the total flow $Q_T$ that is equal to or greater than the excess flow ($Q_E$) ($Q_E = Q_T - Q_R$) is directed by the flow diverter 132 to the equalization basin 130 for storage and/or flow equalization. In other words, any portion of the influent wastewater total flow $Q_T$ that is not directed to the reactor 112, is directed to the equalization basin 130 for storage. The wastewater in the equalization basin 130 can be recirculated, via a return pump 138 and conduit 140, back to the flow diverter 132 and then directed to the reactor 112 in order to maintain flow to the reactor 112 and reduce the volume of wastewater in the equalization basin 130. Alternatively, the wastewater in the equalization basin 130 may be pumped directly from the equalization basin 130 to the reactor 112.

To the extent the digestion of the sludge and biosolids held within the equalization basin 130 produces a relatively high concentration of ammonia within the equalization basin 130 when digestion recommences during the springtime warmup, it will be appreciated that the wastewater within the equalization basin 130 will be directed through the reactor 112 prior to being released in the effluent flow. Again, as set forth above, during the cold weather months, the sludge and biosolids can be accumulated and stored in the equalization basin 130. During the springtime warmup, the wastewater in the equalization basin 130 increases in temperature and digestion of the sludge and biosolids therein recommences. The rapid digestion of the sludge and biosolids can result in the production of an undesirable amount of ammonia. However, the wastewater within equalization basin 130 is not discharged directly into the effluent flow from the equalization basin 130. Instead, the wastewater in the equalization basin 130 is first directed through the reactor 112, which is suitable for removing at least a substantial portion of such ammonia from the wastewater prior to its discharge in the effluent flow.

Figure 4A:
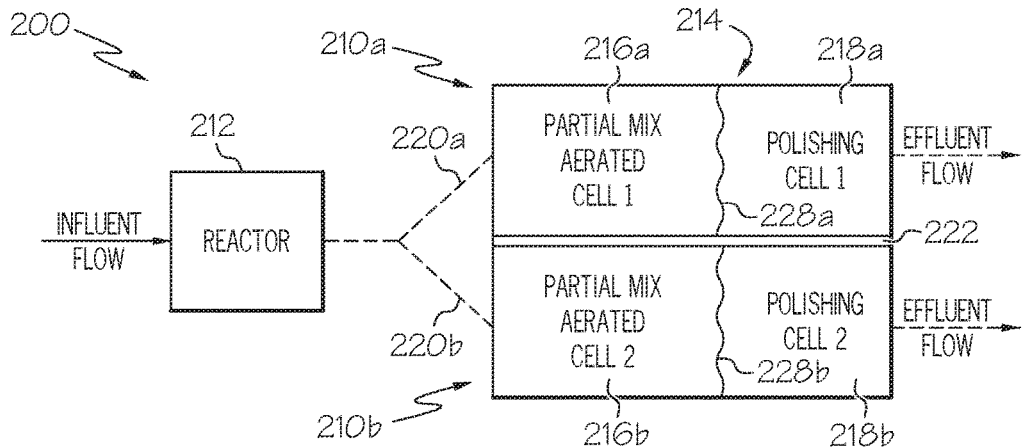
FIG. 4A is a schematic plan view of a wastewater treatment system including a reactor and two parallel downstream zones formed in a single basin and separated by a dividing baffle or the like in accordance with a one embodiment of the present invention.
Figure 4B:
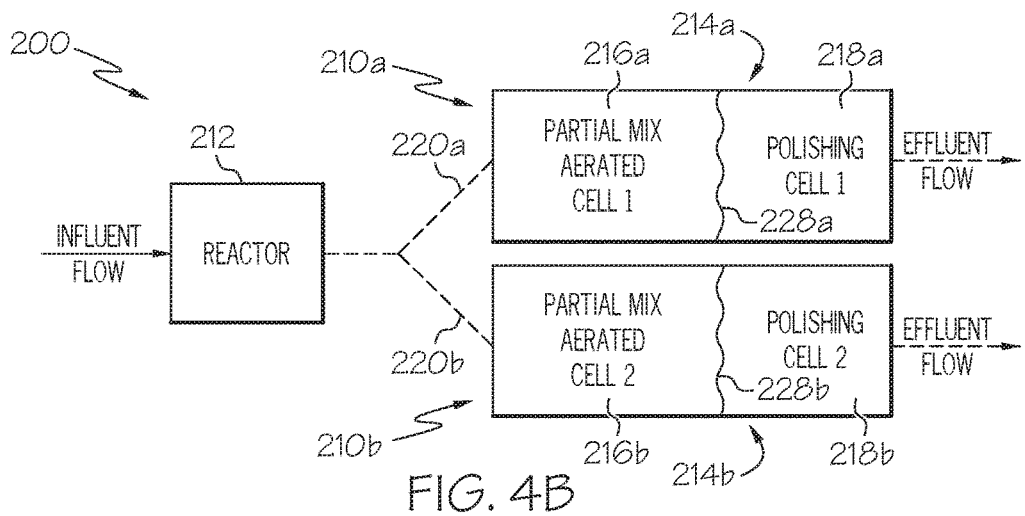
FIG. 4B is a schematic plan view of a wastewater treatment system including a reactor and two parallel downstream zones formed in two separate basins in accordance with a another embodiment of the present invention.
Figure 4C:
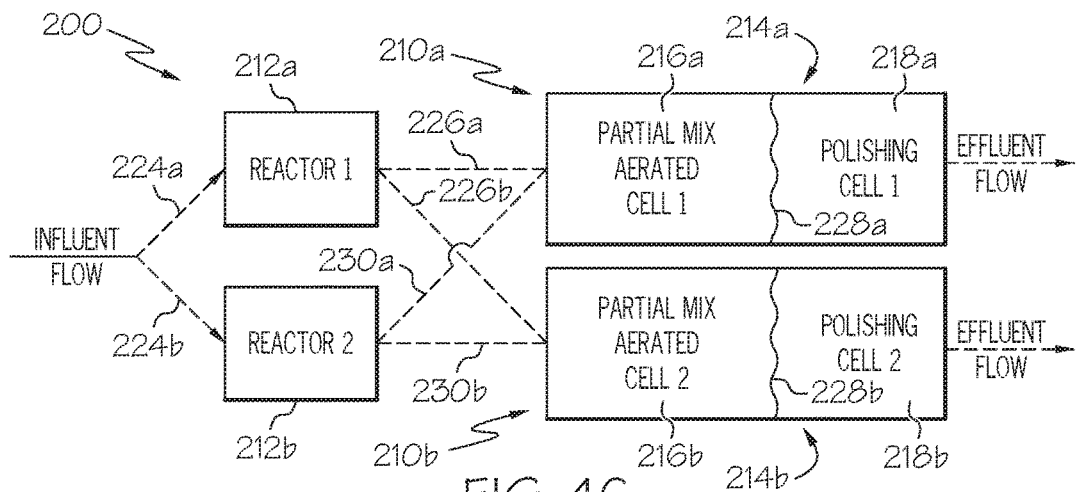
FIG. 4C is a schematic plan view of a wastewater treatment system including two parallel reactors and two parallel downstream zones formed in two separate basins in accordance with a further embodiment of the present invention.

FIGS. 4A-4C illustrate further embodiments of wastewater treatment systems 200 that each include at least two parallel treatment zones 210a and 210b located downstream from at least one reactor 212. As will be discussed in greater detail below, the system 200 can be operated such that it utilizes the first and second treatment zones 210a and 210b in alternating fashion to prevent or reduce ammonia rebound during periods of warming weather. As shown, the first downstream zone 210a comprises a first partial mix cell 216a and a first polishing cell 218a separated by a first wall or curtain 228a. Likewise, the second downstream zone 210b comprises a second partial mix cell 216b and a second polishing cell 218b separated by a second wall or curtain 228b. It will be appreciated that the partial mix cells 216a and 216b can be similar to the partial mix cell 116 described above, that the polishing cells 218a and 218b can be similar to the partial mix cell 118 described above, and that the walls or curtains 228a and 228b can be similar to the wall or curtain 128 described above. It will further be understood that the system 200 can also include a digester 124, which may operate in the manner described above, and/or an influent equalization basin 130, which may also operate in the manner described above.

In one embodiment, as demonstrated in FIG. 4A, the first and second parallel zones 210a and 210b can be formed in a single basin 214 and separated by a dividing wall, curtain, partition, berm or baffle 222. It will be appreciated that like the basin 114 discussed above, the basin 214 may be formed from an existing lagoon (e.g., lagoon 14) that is modified in accordance with the present invention. The baffle 222 and the walls 228a and 228b may be added to the existing lagoon 14 along with appropriate inlets and outlets in order to repurpose the existing lagoon 14. In this manner, the two parallel zones 210a and 210b can be constructed without the need for excavating an additional basin. Additionally, some existing lagoons 14 may be too large for effectively employing a partial mix cell and polishing cell therein in order to prevent algae. However, having two parallel zones 210a and 210b will allow aeration and mixing in a volume suitable for controlling the algae. It will further be understood that additional baffles (not shown) and additional walls (not shown) may also be added to the existing lagoon 14 in order to create parallel zones in addition to the two parallel zones 210a and 210b shown. As discussed below, wastewater treated in the reactor 212 may be transferred or otherwise diverted to one or both of the partial mix cells 216a and 216b, either alternately or concurrently, though conduits 220a and 220b, respectively.

FIG. 4B depicts an embodiment of the system 200 wherein the parallel zones 210a and 210b are respectively located in independent basins 214a and 214b. As set forth below, the zones 210a and 210b in this embodiment may be utilized in a manner suitable to the zones 210a and 210b in the embodiment shown in FIG. 4A. Of course, more than two zones may be included in this embodiment as well.

FIG. 4C illustrates an embodiment of the system 200 that includes two reactors 212a and 212b located upstream of the parallel zones 210a and 210b. Again, the zones 210a and 210b in this embodiment may be utilized in a manner similar to the zones 210a and 210b in the embodiment shown in FIG. 4A. The influent flow of wastewater into the system 200 may be directed to either one or both of the reactors 212a and 212b, either alternately or concurrently, though conduits 224a and 224b, respectively. Wastewater treated in the reactor 212a may be transferred or otherwise diverted to one or both of the partial mix cells 216a and 216b, either alternately or concurrently, though conduits 226a and 226b, respectively. Likewise, wastewater treated in the reactor 212b may be transferred or otherwise diverted to one or both of the partial mix cells 216a and 216b, either alternately or concurrently, though conduits 230a and 230b, respectively.

More than two downstream treatment zones may be included in this embodiment as well.

Turning attention now to a method for treating wastewater using the system 200, it will be appreciated that the system 200 may be operated in multiple modes of operation when specific conditions are met in order to prevent or reduce ammonia rebound, especially during periods of warming weather.

Figure 5A:
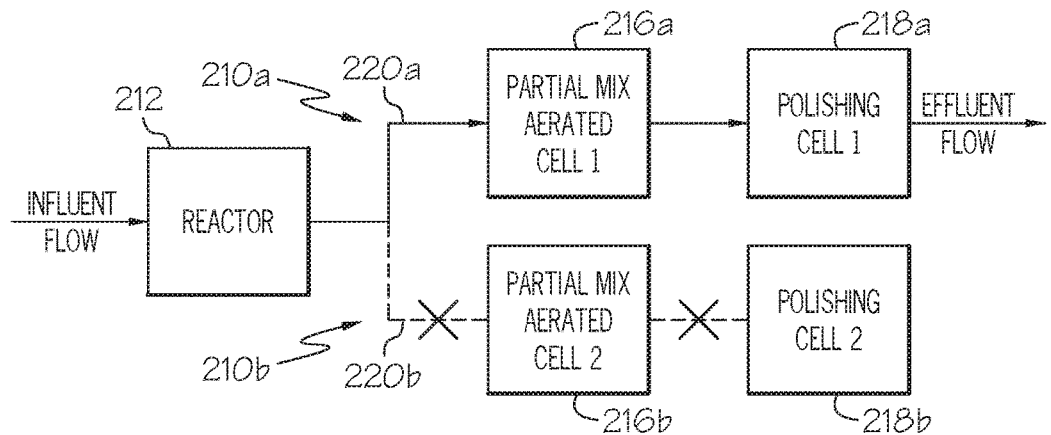
FIG. 5A is a schematic diagram illustrating a mode of operation, wherein wastewater flows from the reactor to a first downstream treatment zone.

FIG. 5A depicts a mode of operation wherein wastewater treated in the reactor 212 is directed to the first zone 210a, specifically to the first partial mix cell 216a via conduit 220a. During this mode of operation, all or at least a substantial portion of the wastewater treated in the reactor 212 is prevented from flowing to the second zone 210b, specifically to the second partial mix cell 216b (as represented by the "X" over conduit 220b). Accordingly, all of the wastewater treated in the reactor 212 may flow into, and out of, the first zone 210a. Meanwhile, there is no flow of wastewater into, or out of, the second zone 210b.

Figure 5B:
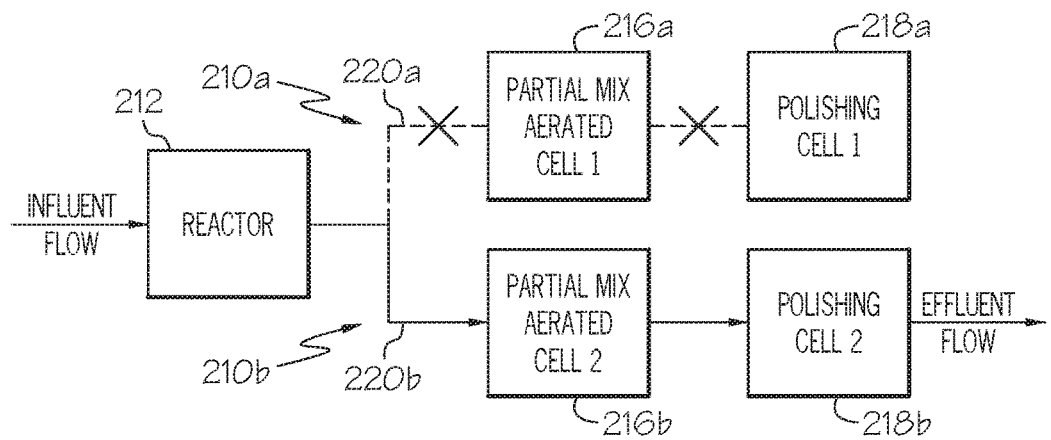
FIG. 5B is a schematic diagram illustrating a another mode of operation, wherein wastewater flows from the reactor to a second downstream treatment zone.

FIG. 5B depicts another mode of operation wherein wastewater treated in the reactor 212 is directed to the second zone 210b, specifically to the first partial mix cell 216b via conduit 220b. During this mode of operation, all or at least a substantial portion of the wastewater treated in the reactor 212 is prevented from flowing to the first zone 210a, specifically to the first partial mix cell 216a (as represented by the "X" over conduit 220a). Accordingly, all of the wastewater treated in the reactor 212 may flow into, and out of, the second zone 210b. Meanwhile, there is no flow of wastewater into, or out of, the first zone 210a.

In one embodiment, the system 200 operates in the mode of operation illustrated in FIG. 5A (i.e., by directing wastewater to the first zone 210a) until an initial springtime warmup period when the temperature of the wastewater begins to increase and the digestion of the sludge and biosolids that have accumulated in the first partial mix cell 216a during the course of the winter recommences. At the beginning of the initial springtime warmup period, the system 200 may then transition to the mode of operation illustrated in FIG. 5B (i.e., by directing wastewater to the second zone 210b). The sludge and biosolids that accumulated in the second partial mix cell 216b during the prior mode of operation will be stabilized by that time. The system 200 can then operate in the mode of operation illustrated in FIG. 5B until the following springtime warmup period when the temperature of the wastewater begins to increase and the digestion of the sludge and biosolids that have accumulated in the second partial mix cell 216b during the course of the winter recommences. The sludge and biosolids that accumulated in the first partial mix cell 216a during the prior mode of operation will be stabilized by that time.

Accordingly, it will be appreciated that the system 200 may transition between the mode of operation illustrated in FIG. 5A and the mode of operation illustrated in FIG. 5B on an annual basis. In other words, for example, the system 200 can operate in the mode of operation illustrated in FIG. 5A during a first one-year period, may operate in the mode of operation illustrated in FIG. 5B during the second one-year period, may operate in the mode of operation illustrated in FIG. 5A during the third one-year period, and so on. Operating the system 200 in this fashion has the benefit of fully stabilizing the sludge and biosolids in the first partial mix cell 216a while the system 200 operating in the mode of operation shown in FIG. 5B and, likewise, fully stabilizing the sludge and biosolids in the second partial mix cell 216b while the system 200 operating in the mode of operation shown in FIG. 5A, without having the potential for ammonia rebound at any time. This allows for continuous treatment at all times with the same process and expected results. Utilizing two partial mix/polishing trains 210a and 210b permits easier operation and assures long-term digestion of sludge and biosolids for a full year therefore permitting increased storage and disposal capabilities.

Figure 5C:
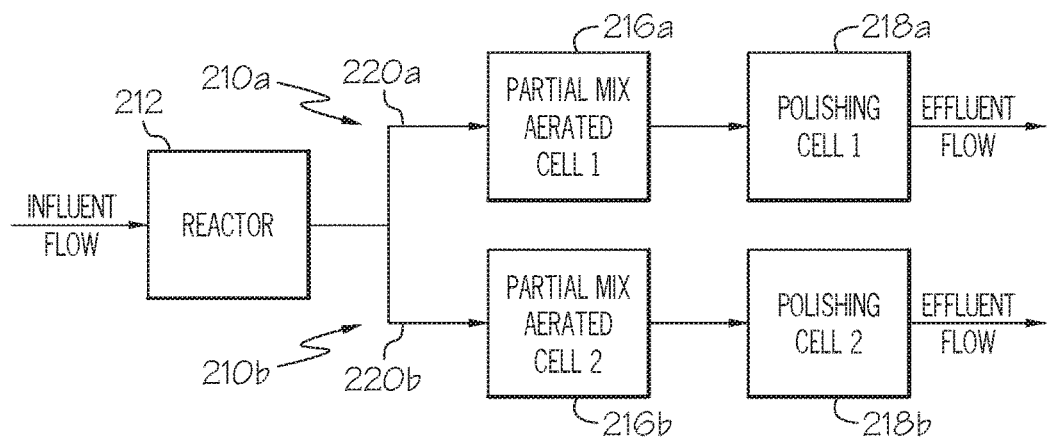
FIG. 5C is a schematic diagram illustrating a further mode of operation, wherein wastewater flows from the reactor to both first and second downstream treatment zones.

FIG. 5C illustrates a further mode of operation wherein wastewater treated in the reactor 212 is concurrently directed to both the first zone 210a and the second zone 210b. This mode of operation may be undertaken, for example, during the summer months after the biosolids and sludge has been digested during the springtime warmup period. During at least the winter months, the system 200 is transitioned to one of the modes of operation shown in FIG. 5A or 5B so that biosolids and sludge are only accumulated in one of the partial mix cells 216a or 216b during the winter months. Then, during the springtime warmup period, the system 200 is transitioned to the other of the modes of operation shown in FIG. 5B or 5A so as to avoid ammonia rebound.

Like discussed above relative to system 100, the system 200 may operate in and transition between various modes of operation (See FIGS. 5A-5C) depending upon various factors. The transition steps may be automatically controlled by a control system 101, as discussed above relative to system 100, or may be manually controlled by an operator. Like with system 100, the method utilized relative to system 200 includes the step of transitioning the system 200 between its various methods of operation when one or more first or second conditions or parameters are met. Such conditions and parameters may include specific increases in wastewater temperature, ammonia concentration, nutrient concentration, time of year and date among others. The conditions and parameters are discussed above in detail. For example, in one embodiment, the system 200 may transition from the mode of operation shown in FIG. 5A to the mode of operation shown in FIG. 5B when temperature of the wastewater increases from a temperature that is less than a predetermined temperature to a temperature that is equal to or greater than the predetermined temperature, as discussed above relative to system 100. In another embodiment, the system 200 may transition from the mode of operation shown in FIG. 5A to the mode of operation shown in FIG. 5B when a concentration of ammonia in the wastewater increases from a concentration that is less than a predetermined ammonia concentration to a concentration that is equal to or greater than the predetermined ammonia concentration, as also discussed above relative to system 100. It will be appreciated that the conditions triggering the transitions between the various mode may be generally identical annually-occurring conditions.

Further, it will be appreciated that the system 200 and its method for treating wastewater, as described herein, may be beneficial for use in warm weather climates as well, as it would provide even greater control and stabilization of the sludge and bio solids than a continuously-operating single zone system.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for treating wastewater in a wastewater treatment system, said method including first and second modes of operation and comprising the steps of:
   providing a reactor, a partial mix cell, and a polishing cell arranged in series;
   supplying wastewater to said reactor;
   during said first mode of operation:
      allowing a flow of said wastewater from said reactor to said partial mix cell; and
      allowing a flow of said wastewater from said partial mix cell to said polishing cell;
   during said second mode of operation:
      preventing at least a substantial portion of the flow of said wastewater from said reactor to said partial mix cell;
      preventing at least a substantial portion of the flow of said wastewater from said partial mix cell to said polishing cell; and
      allowing at least a substantial portion of said wastewater to flow from said reactor to said polishing cell, thereby bypassing said partial mix cell;
   measuring at least one of wastewater temperature, ambient air temperature, wastewater nutrient concentration, wastewater ammonia concentration and a period of time in order to control a transition from said first mode of operation to said second mode of operation; and
   discharging said wastewater from said wastewater treatment system in an effluent stream.

2. The method of claim 1 further comprising the step of preventing at least a substantial portion of the flow of said wastewater from flowing directly from said reactor to said polishing cell during said first mode of operation.

3. The method of claim 1, wherein sludge and biosolids are present in the partial mix cell, and the method further comprising the steps of retaining and digesting at least a portion of sludge and biosolids in said partial mix cell during said second mode of operation.

4. The method of claim 1 further comprising the steps of:
   providing at least one of a digester, a sludge disposal basin, an equalization basin, and a sludge management system; and
   removing at least a portion of sludge and biosolids from said reactor during said first mode of operation and directing said at least a portion of sludge and biosolids to said at least one of digester, sludge disposal basin, equalization basin, and sludge management system.

5. The method of claim 1 further comprising the steps of:
   providing at least one of a digester, a sludge disposal basin, an equalization basin, and a sludge management system; and
   removing at least a portion of sludge and biosolids from said reactor during said second mode of operation and directing said at least a portion of sludge and biosolids to said at least one of digester, sludge disposal basin, equalization basin, and sludge management system.

6. The method of claim 1 further comprising the step of measuring at least one of wastewater temperature, ambient air temperature, wastewater nutrient concentration, wastewater ammonia concentration and a period of time in order to control a transition from said second mode of operation to said first mode of operation.

7. A method for treating wastewater in a wastewater treatment system, said method including first and second modes of operation and comprising the steps of:
   providing a reactor, a partial mix cell, and a polishing cell arranged in series;
   supplying wastewater to said reactor;
   during said first mode of operation:
      allowing a flow of said wastewater from said reactor to said partial mix cell; and
      allowing a flow of said wastewater from said partial mix cell to said polishing cell;
   during said second mode of operation:
      preventing at least a substantial portion of the flow of said wastewater from said reactor to said partial mix cell;
      preventing at least a substantial portion of the flow of said wastewater from said partial mix cell to said polishing cell; and
      allowing at least a substantial portion of said wastewater to flow from said reactor to said polishing cell, thereby bypassing said partial mix cell;
   transitioning from said first mode of operation to said second mode operation when a first condition is met, said first condition being based on at least one of:
      said wastewater temperature;
      said nutrient concentration in said partial mix cell, polishing cell or effluent stream; and
      said ammonia concentration in said partial mix cell, polishing cell or effluent stream;
   transitioning from said second mode of operation to said first mode operation when a second condition is met, said second condition being based on at least one of:
      said ammonia concentration in said partial mix cell; and
      a digestion and stabilization of sludge and biosolids in said partial mix cell;
   discharging said wastewater from said wastewater treatment system.

8. The method of claim 7, wherein said step of transitioning from said first mode of operation to said second mode operation includes the following sub-steps:
   terminating at least a substantial portion of the flow of said wastewater from said reactor to said partial mix cell;
   terminating at least a substantial portion of the flow of said wastewater from said partial mix cell to said polishing cell; and
   establishing the flow of said wastewater from said reactor to said polishing cell.

9. The method of claim 7, wherein said step of transitioning from said second mode of operation to said first mode operation includes the following sub-steps:
establishing the flow of said wastewater from said reactor to said partial mix cell;
establishing the flow of said wastewater from said partial mix cell to said polishing cell; and
terminating at least a substantial portion of the flow of said wastewater from said reactor to said polishing cell.

10. The method of claim 7, wherein said first condition is met when the temperature of said wastewater increases from a temperature that is less than a predetermined temperature to a temperature that is equal to or greater than said predetermined temperature.

11. The method of claim 10, wherein said predetermined temperature is in a range between about 12° C. and about 18° C.

12. The method of claim 10, wherein said predetermined temperature is approximately 15° C.

13. The method of claim 7, wherein said first condition is met when the concentration of ammonia in at least one of said partial mix cell, polishing cell and effluent stream increases from a concentration that is less than a first predetermined ammonia concentration to a concentration that is equal to or greater than said first predetermined ammonia concentration.

14. The method of claim 13, wherein said first predetermined ammonia concentration is in a range between about 0.1 mg/L and about 5.0 mg/L.

15. The method of claim 13, wherein said first predetermined ammonia concentration is approximately 1.0 mg/L.

16. The method of claim 7, wherein said second condition is met when the concentration of ammonia in said partial mix cell decreases from a concentration that is greater than a second predetermined ammonia concentration to a concentration that is equal to or less than said second predetermined ammonia concentration.

17. The method of claim 16, wherein said second predetermined ammonia concentration of ammonia is in a range between about 0.1 mg/L and about 5.0 mg/L.

18. The method of claim 16, wherein said second predetermined ammonia concentration of ammonia is 1.0 mg/L.

19. The method of claim 7, wherein said second condition is met when at least one of sludge and biosolids in said partial mix cell has at least partially digested and become substantially stabilized.

20. A wastewater system comprising:
a reactor, a partial mix cell, and a polishing cell arranged in series,
a first conduit for transferring at least a substantial portion of the flow of said wastewater from said reactor to said partial mix cell during a first mode of operation; and
a second conduit for transferring at least a substantial portion of the flow of said wastewater from said reactor to said polishing cell, thereby bypassing said partial mix cell, during a second mode of operation;
a third conduit connecting the partial mix cell with the polishing cell;
wherein said wastewater treatment system is adapted for measuring at least one wastewater temperature, ambient air temperature, wastewater nutrient concentration, wastewater ammonia concentration, and a period of time, in order to control a transition from said first mode of operation to a second mode of operation.

21. The wastewater treatment system of claim 20 further comprising:
at least one of a digester, a sludge disposal basin, an equalization basin, and a sludge management system; and
a discharge conduit connecting said reactor to said at least one of digester, sludge disposal basin, equalization basin, and sludge management system;
wherein said discharge conduit is adapted for discharging at least a portion of sludge and biosolids from said reactor to said at least one of digester, sludge disposal basin, equalization basin, and sludge management system.

* * * * *